(12) United States Patent
Hubbell et al.

(10) Patent No.: US 10,298,709 B1
(45) Date of Patent: May 21, 2019

(54) PERFORMANCE OF HADOOP DISTRIBUTED FILE SYSTEM OPERATIONS IN A NON-NATIVE OPERATING SYSTEM

(71) Applicant: EMC Corporation, Hopkinton, MA (US)

(72) Inventors: Steven Hubbell, Seattle, WA (US); Ryan M. Peterson, Discovery Bay, CA (US); Tanuj Khurana, Mercer Island, WA (US); Claudio Fahey, Oak Park, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 784 days.

(21) Appl. No.: 14/587,654

(22) Filed: Dec. 31, 2014

(51) Int. Cl.
*G06F 17/30* (2006.01)
*H04L 29/08* (2006.01)

(52) U.S. Cl.
CPC .......... *H04L 67/28* (2013.01); *G06F 17/3048* (2013.01); *G06F 17/30194* (2013.01)

(58) Field of Classification Search
CPC ................ H04L 67/28; G06F 17/3048; G06F 17/30194; G06F 17/30501
See application file for complete search history.

(56) References Cited

U.S. PATENT DOCUMENTS

| 8,543,596 B1 * | 9/2013 | Kostamaa | G06F 17/30194 707/770 |
| 9,063,939 B2 | 6/2015 | Dalton | |
| 9,213,706 B2 * | 12/2015 | Long | G06F 17/30289 |
| 9,648,102 B1 * | 5/2017 | Davis | G06F 15/167 |

(Continued)

FOREIGN PATENT DOCUMENTS

| CN | 101901275 A | * | 12/2010 |
| CN | 103279474 A | * | 9/2013 |
| KR | 20160067289 A | * | 6/2016 |

OTHER PUBLICATIONS

M. Shrivastava, Hadoop-cc (collaborative caching) in real time HDFS, Thesis. Rochester Institute of Technology, Dec. 1, 2012.*
A. Kakade, S. Raut, HDFS with cache system—a paradigm for performance improvement, International Journal of scientific research and management (IJSRM), vol. 2 Issue 12 (2014) pp. 1781-1784.*

(Continued)

*Primary Examiner* — David R Lazaro
*Assistant Examiner* — Robert A Shaw
(74) *Attorney, Agent, or Firm* — Krishnendu Gupta; Sean M. Evans (57) ABSTRACT

Implementations are provided herein for utilizing the two-part nature of HDFS protocol communications received in a non-native HDFS environment to use discriminative information learned in the NameNode request to make the client experience more efficient. NameNode requests can be received by any node among a cluster of nodes. It can be appreciated that in some non-native HDFS, clients can communicate with any nodes among a cluster to perform transactions and need not first communicate with a NameNode. Thus, upon receiving a NameNode request, the non-native HDFS Cluster of Nodes can prefetch data necessary from stable storage to cache memory for efficient reads and/or writes, allocate space on disk for writes, assign the client to communicate with a specific node among the cluster of nodes based on available cluster resources, etc. In this sense, a more efficient client experience can be offered for HDFS clients within a non-native HDFS environment.

15 Claims, 6 Drawing Sheets

(56) References Cited

U.S. PATENT DOCUMENTS

| | | | | |
|---|---|---|---|---|
| 2011/0161294 A1* | 6/2011 | Vengerov | G06F 17/30581 | 707/637 |
| 2011/0258378 A1* | 10/2011 | Ananthanarayanan | G06F 3/061 | 711/114 |
| 2012/0101991 A1* | 4/2012 | Srivas | G06F 17/30194 | 707/623 |
| 2012/0130950 A1* | 5/2012 | Jain | G06F 17/30212 | 707/634 |
| 2012/0150926 A1* | 6/2012 | Adkins | G06F 17/30182 | 707/825 |
| 2012/0151245 A1* | 6/2012 | Chang | G06F 17/30227 | 714/4.1 |
| 2012/0216074 A1* | 8/2012 | Chang | G06F 17/30227 | 714/19 |
| 2013/0151884 A1* | 6/2013 | Hsu | G06F 17/302 | 714/4.11 |
| 2013/0204948 A1* | 8/2013 | Zeyliger | G06F 9/44505 | 709/206 |
| 2013/0227558 A1* | 8/2013 | Du | G06F 9/45558 | 718/1 |
| 2013/0325814 A1* | 12/2013 | Carter | G06F 17/30073 | 707/661 |
| 2014/0019495 A1* | 1/2014 | Borthakur | G06F 17/30203 | 707/827 |
| 2014/0040575 A1* | 2/2014 | Horn | G06F 3/0688 | 711/162 |
| 2014/0047342 A1* | 2/2014 | Breternitz | G06F 9/5061 | 715/735 |
| 2014/0064066 A1* | 3/2014 | Lumezanu | H04L 47/12 | 370/229 |
| 2014/0136779 A1* | 5/2014 | Guha | G06F 9/5066 | 711/114 |
| 2014/0188825 A1* | 7/2014 | Muthukkaruppan | G06F 17/30339 | 707/694 |
| 2014/0195558 A1* | 7/2014 | Murthy | G06F 17/30545 | 707/770 |
| 2014/0229455 A1* | 8/2014 | Bestler | G06F 17/30159 | 707/695 |
| 2014/0304357 A1* | 10/2014 | Bestler | G06F 17/30 | 709/213 |
| 2014/0359044 A1* | 12/2014 | Davis | H04L 45/60 | 709/213 |
| 2014/0359050 A1* | 12/2014 | Butt | G06F 15/17331 | 709/214 |
| 2015/0067004 A1* | 3/2015 | Shvachko | G06F 17/30194 | 707/827 |
| 2015/0074671 A1* | 3/2015 | Yeddanapudi | H04L 47/11 | 718/103 |
| 2015/0074672 A1* | 3/2015 | Yeddanapudi | H04L 47/11 | 718/103 |
| 2015/0074683 A1* | 3/2015 | Singh | H04L 47/11 | 719/312 |
| 2015/0088827 A1* | 3/2015 | Xu | G06F 17/30215 | 707/634 |
| 2015/0095384 A1* | 4/2015 | Antony | H04L 67/1097 | 707/827 |
| 2015/0106578 A1* | 4/2015 | Warfield | G06F 3/0613 | 711/158 |
| 2015/0112951 A1* | 4/2015 | Narayanamurthy | G06F 17/30215 | 707/694 |
| 2015/0113010 A1* | 4/2015 | Muthyala | G06F 17/30076 | 707/756 |
| 2015/0169612 A1* | 6/2015 | Kashyap | G06F 3/06 | 707/692 |
| 2015/0248420 A1* | 9/2015 | Makkar | G06F 17/30088 | 707/649 |
| 2015/0278244 A1* | 10/2015 | Shvachko | G06F 17/30174 | 707/634 |
| 2015/0310030 A1* | 10/2015 | Balmin | G06F 17/30194 | 707/704 |

OTHER PUBLICATIONS

Brad Hedlund, Understanding Hadoop Clusters and the Network, Sep. 10, 2010 http://bradhedlund.com/2011/09/10/understanding-hadoop-clusters-and-the-network/.*

Shrivistava and Bischof, Hadoop-Collaborative Caching in Real Time HDFS, WORLDCOMP'13, Las Vegas, NV, Jul. 22-25, 2013.*

Shvachko et al, The Hadoop File System, Mass Storage Systems and Technologies (MSST), IEEE 26th Symposium , May 2010 , pp. 1-10. http://storageconference.org/2010/Papers/MSST/Shvachko.pdf.*

Shidler, Hadoop Distributed File System (HDFS) Architectural Documentation, http://itm-vm.shidler.hawaii.edu/HDFS/ . . . , retrieved via Internet Archive (2014).*

Tahir et al, A Dynamic Caching Mechanism for Hadoop using Memcached, 2012 http://tahir2.web.engr.illinois.edu/.*

Pius et al Optimizing Hadoop Block Placement Policy & Cluster Blocks Distribution, International Scholarly and Scientific Research & Innovation 6(10), scholar.waset.org, 2012.*

Chansler et al, The Hadoop Distributed File System, https://web.archive.org/web/20140720035206/http://www.aosabook.org/en/hdfs.html.*

Borthakur, The Hadoop Distributed File System: Architecture and Design. The Apache Software Foundation, 2008.*

Tantisiriroj et al,Data-intensive File Systems for Internet Services: A Rose by Any Other Name . . . (CMU-PDL-08-114), Oct. 2008.*

Dong et al Correlation based File Prefetching Approach for Hadoop, 2nd IEEE International Conference on Cloud Computing Technology and Science (CloudCom'2010), IEEE, 2010.*

Li et al, TaP: Table-based Prefetching for Storage Caches, FAST '08: 6th USENIX Conference on File and Storage Technologies.*

Dong et al "Correlation based File Prefetching Approach for Hadoop", 2nd IEEE International Conference on Cloud Computing Technology and Science (CloudCom'2010), IEEE, 2010 (Year: 2010).*

M. Shrivastava,"Hadoop-cc (collaborative caching) in real time HDFS" MS Thesis. Rochester Institute of Technology, 2012 (Year: 2012).*

Tahir et al "A Dynamic Caching Mechanism for Hadoop using Memcached", 2012 (Year: 2012).*

* cited by examiner

PERFORMANCE OF HADOOP DISTRIBUTED FILE SYSTEM OPERATIONS IN A NON-NATIVE OPERATING SYSTEM

FIELD OF THE INVENTION

This invention relates generally to processing data, and more particularly to systems and methods for improving the performance of a Hadoop Distributed File System ("HDFS") calls in a non-HDFS operating system.

BACKGROUND OF THE INVENTION

Distributed file systems offer many compelling advantages in establishing high performance computing environments. One example is the ability to easily expand, even at large scale. The Hadoop Distributed File System ("HDFS") is a distributed file system, designed to run on commodity hardware, that stores data across a number of Datallodes. Not only is data stored across a number of Datallodes, individual files or objects are broken down into data blocks that can be stored and/or mirrored on different Datallodes. It can be appreciated that by storing data across a number of Datallodes, the HDFS is more tolerant to hardware failure.

HDFS is a designed under a master/slave architecture. Each HDFS cluster consists of a single NameNode that acts as a master server that manages the file system namespace and regulates access to files by clients. A plurality of Datallodes operate as slaves to the NameNode, usually configured one per node, that manage storage attached to the Datallode. Within the HDFS cluster, files are split into one or more blocks and these blocks are stored in the set of Datallodes. The NameNode controls operations like opening files, closing files, renaming files and directories, and mapping of blocks to Datallodes. The Datallodes then operate to serve read and write requests made by the clients of the HDFS. Datallodes also perform block creation, deletion, and replication based on instructions received from the NameNode.

In processing reads or writes, an HDFS client first makes a call to the NameNode to determine how to proceed. For example, in the context of a write, an HDFS client will cache the write data locally on the client in a temporary file. When the temporary file accumulates data over a certain a threshold, the client will contact the NameNode with the request to write data to the HDFS, the NameNode can insert the file name into the file system and allocate data blocks in Datallodes. The NameNode then responds to the client with the identity of the Datallode(s) and the destination data block address(es) where the write data will be stored in the HDFS. Similarly, for read requests, an HDFS client will first contact the NameNode to determine the Datallode and associated block addresses where the data is stored that is necessary to transact the read request. The client will then contact the Datallodes and request the data from the associated block addresses. In both instances, HDFS read requests and HDFS write requests, an HDFS client first contacts the NameNode with the overview of their request, and then waits for the NameNode to respond with the relevant information to continue processing the request.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a first part Hadoop Distributed File System ("HDFS") Protocol request can be received, wherein the first part HDFS protocol request includes a request for a Datallode associated with a set of blocks associated with at least one file. In response to receiving the first part HDFS protocol request, a node among a cluster of nodes can be determined to be the node to respond to the first part HDFS protocol request and the set of blocks can be prefetched into a local cache memory of the node. The response to the first part HDFS protocol request can contain a set of pseudo blocks wherein the pseudo blocks are associated with the node, and wherein the pseudo blocks are representative of the Datallode.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "inode" or "logical inode" ("LIN") as used herein refers to in-memory representation of on-disk data structures that may store information, or meta-data, about files and directories, such as file size, file ownership, access mode (read, write, execute permissions), time and date of creation and modification, file types, data protection process information, etc. In one implementation, LIN's may be in a known location in a file system, for example, residing in cache memory for fast and/or efficient access by the file system. Before or in conjunction with performing a file system operation on a file or directory, the system call may access the contents of the LIN and/or the contents of the file in determining how to process the system call. In some implementations, a data structure explicitly named "inode" or LIN may be absent, but file systems may have data structures that store data similar to LINs and may provide capabilities similar to LINs as described herein. It can be appreciated that the concepts and implementations as provided herein are functional using data structures not termed LINs or inodes but that offer the same functionality to the file system.

Implementations are provided herein for utilizing the two-part nature of HDFS protocol communications received in a non-native HDFS environment to use discriminative information learned in the NameNode request to make the client experience more efficient. NameNode requests can be received by any node among a cluster of nodes. It can be appreciated that in some non-native HDFS, clients can communicate with any nodes among a cluster to perform transactions and need not first communicate with a NameNode. Thus, upon receiving a NameNode request, the non-native HDFS Cluster of Nodes can prefetch data necessary from stable storage to cache memory for efficient reads and/or writes, allocate space on disk for writes, assign the client to communicate with a specific node among the cluster of nodes based on available cluster resources, etc. In this sense, a more efficient client experience can be offered for HDFS clients within a non-native HDFS environment.

As stated in the background, HDFS is a designed under a master/slave architecture. Each HDFS cluster consists of a single NameNode that acts as a master server that manages the file system namespace and regulates access to files by clients. A plurality of Datallodes operate as slaves to the NameNode, usually configured one per node, that manage storage attached to the Datallode. Within the HDFS cluster, files are split into one or more blocks and these blocks are stored in the set of Datallodes. The NameNode controls operations like opening files, closing files, renaming files and directories, and mapping of blocks to Datallodes. The Datallodes then operate to serve read and write requests made by the clients of the HDFS. Datallodes also perform block creation, deletion, and replication based on instructions received from the NameNode.

Figure 1:
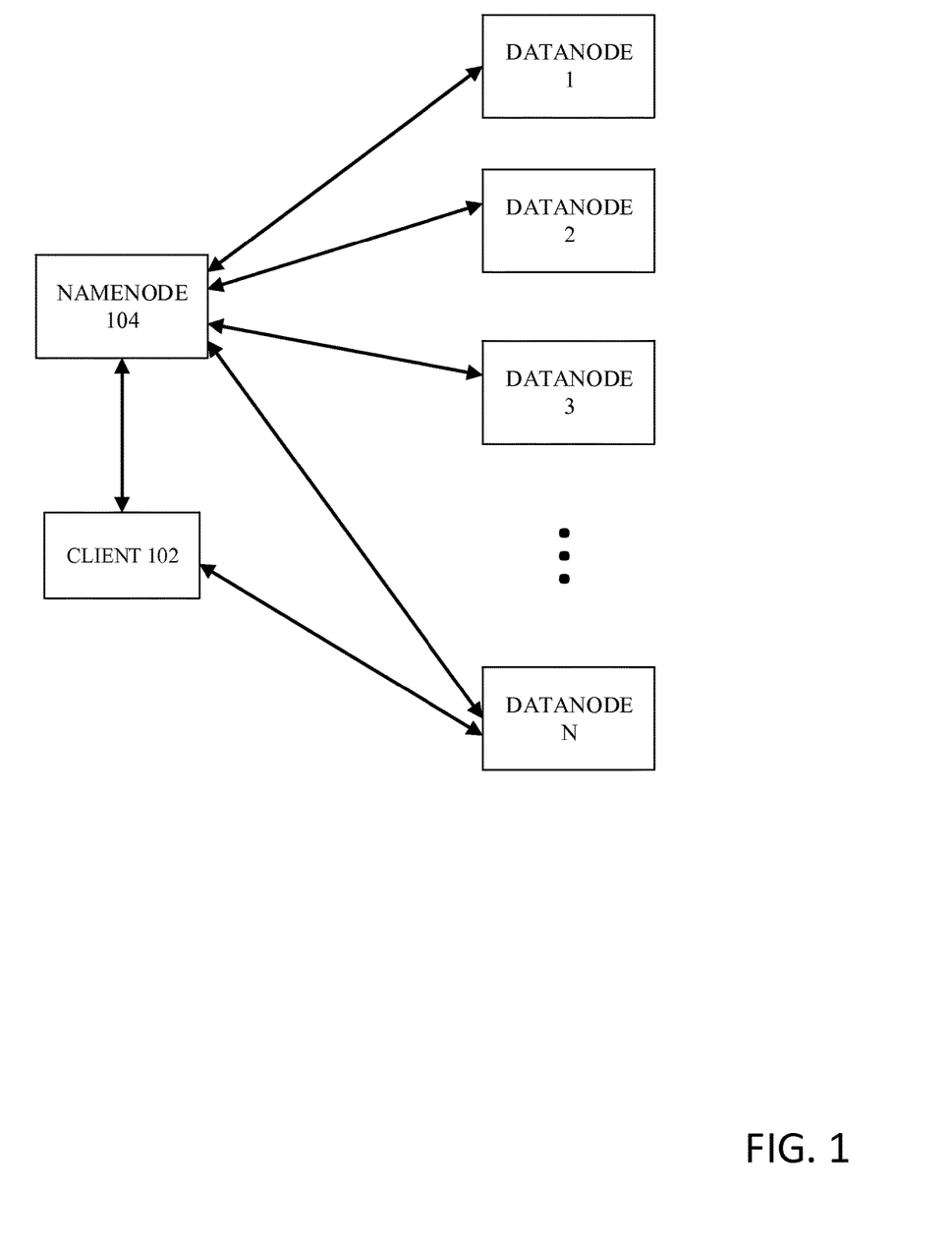
FIG. 1 illustrates an example of a native Hadoop Distributed File System in accordance with implementations of this disclosure.

Referring now to FIG. 1, there is illustrated an example of a native Hadoop Distributed File System in accordance with implementations of this disclosure. The illustrated example includes a client 102, a NameNode 104, and a set of Datallodes, e.g., Datallode 1, Datallode 2, Datallode 3, and Datallode "N" (wherein "N" is a positive integer greater than 3). It can be appreciated that typical HDFS cluster contains one NameNode and then any number of Datallodes depending on the needs of the installation. For example, the more data an HDFS cluster hosts, it is likely to have more Datallodes to store that data; however, it can be appreciated that not all Datallodes need employ the same amount of storage capacity.

In processing reads or writes, an HDFS Client 102 first makes a call to the NameNode 104 to determine how to proceed. For example, in the context of a write, an HDFS client 102 will cache the write data locally on the client 102 in a temporary file. When the temporary file accumulates data over a certain a threshold, the Client 102 will contact the NameNode 104 with the request to write data to the HDFS, the NameNode 104 can insert the file name into the file system and allocate data blocks in the Datallodes. For example, the NameNode may choose the primary destination for the write data, and then successive mirroring locations where the data is eventually mirrored to within the HDFS cluster. The NameNode then responds to the client with the identity of the Datallode(s) and the destination data block address(es) where the write data will be stored in the HDFS. It can be appreciated that not all of the data blocks associated with the write data be stored on the same Datallode, thus client 102 may be in contact with more than one Datallode in storing write data.

Similarly, for read requests, an HDFS client 102 will first contact the NameNode 104 to determine the Datallode and associated block addresses where the data is stored that is necessary to transact the read request. The client 102 will then contact the Datallodes reported by the NameNode 104 as hosting the data, and request the data from the associated block addresses. In both instances, HDFS read requests and HDFS write requests, an HDFS client first contacts the NameNode with the overview of their request, and then waits for the NameNode to respond with the relevant information to continue processing the request.

Figure 2:
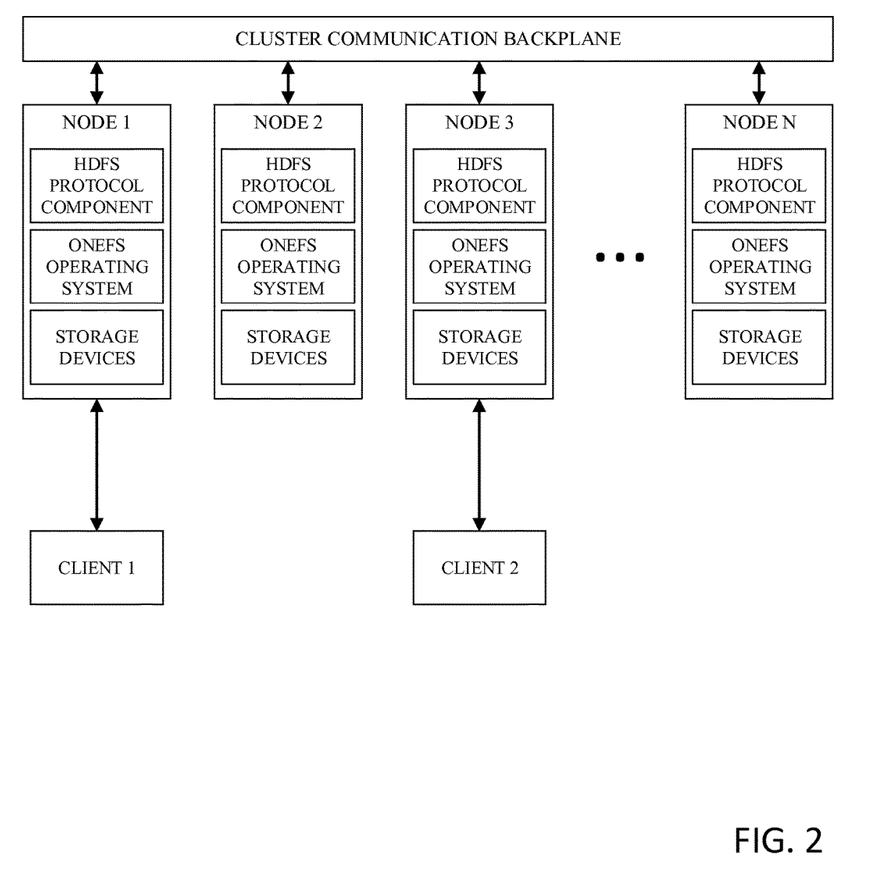
FIG. 2 illustrates an example of a non-native Hadoop Distributed File System in accordance with implementations of this disclosure.

Referring now to FIG. 2, there is illustrated an example of a non-native Hadoop Distributed File System in accordance with implementations of this disclosure. The cluster of nodes (e.g., Node 1, Node 2, Node 3, and Node N) in FIG. 2 are using OneFS operating system as sold by EMC Corporation in its product EMC Isilon. Each node, running OneFS, can communicate with individual clients and offer access to any file stored within the OneFS distributed file system. For example, Client 1 is connected to Node 1 and can ask for a file that is stored within the distributed file system. The file is associated with an inode, and Node 1, using the contents in the inode and/or data structures referenced by the inode, can determine which nodes host the data blocks that make up the file system. Node 1 can then communicate with other nodes using the cluster communication backplane to store/retrieve data to/from node 2, node 3, etc. as requested and/or needed by Client 1. Similarly, Client 2 can connect to Node 3 and ask to store/retrieve any file in the OneFS distributed file system no matter which nodes may actually store the data Client 2 may be requesting access to. In this sense, the file system depicted in FIG. 2 isn't a master/slave architecture like an HDFS file system, but rather any node can receive operations from a client and act on them immediately without having to receive a "NameNode" request and then instruct the client which Datallodes to retrieve data from.

In addition to support for standard networking protocols like SMB, NFS/CIFS, FTP, etc., the Nodes depicted in FIG. 2 also contain an HDFS protocol component. The HDFS protocol component provides for Node 1 to receive communications from Client 1 using the HDFS protocol. Thus, Client 1 can send out a NameNode request to Node 1 asking for the location (e.g., Datallodes) where the data it wishes to access is stored. The HDFS protocol component in Node 1 can receive the NameNode request; however, it can be appreciated that as every node in the cluster of nodes depicted in FIG. 2 is capable of receiving file storage requests and fulfilling them, returning to Client 1 a specific node in the cluster where the files/data is stored is unnecessary as Node 1 itself has access to all the data Client 1 may be requesting. This same example is true for Client 2 if it makes an HDFS protocol request for a file to Node 3, as Node 3, like Node 1, has access to all the data Client 2 may be requesting.

It can be appreciated that step of receiving a NameNode request from a client is likely unnecessary, as any node a client communicates with to access data stored within the distributed file system will be accessible to the client by the node it contacts. One means to increase efficiency would be to eliminate the Client's need to first send the NameNode request; however, adjusting every HDFS exchange generated by the client to remove the NameNode request could require a custom interface, a custom application programming interface, or other solutions which may increase processing time required by the client to effectuate the removal, or possibly make the communication with the cluster of node not running native HDFS less transparent.

Another means to increase efficiency would be upon receipt of any NameNode request, no matter the request, the non-native HDFS Node could return a set of pseudo blocks that are local to the Node responding to the request. For example, as stated above, HDFS files are broken up to blocks and split up among Datallodes for storage. Upon receipt of an HDFS protocol request to read a file by Node 1, Node 1 can respond that all of the parts of the file are accessible in "pseudo" block addresses that are local to Node 1, so that the Client 1 interacts exclusively with Node 1 in retrieving its desired data, rather than trying to contact Node 2, Node 3, etc. This example is valid even in a situation where Node 1 may not store all the data that Client 1 is requesting, as Node 1, through the cluster communications backplane, can ask for receive necessary data from Nodes 2, 3, etc. as required to process Client 1's request.

Implementations disclosed herein provide for further efficiency while maintaining transparency to HDFS clients. A node can receive the first part in a standard two-part HDFS request where the node is treated like a NameNode by the client. In response to receiving the NameNode request that contains discriminative information related to the data being request in a read, or discriminative information related to the data being stored in a write, the non-native HDFS file system can begin preparing for the transaction that it knows is coming with the second part of the HDFS request where the client speaks to the node as a Datallode.

For example, in a read, the node would be aware based on the NameNode request what file/data blocks that client is requesting and prior to or contemporaneously with responding to the client with the pseudo block location addresses where the data is stored locally, the Node could begin prefetching data necessary to honor the request from other nodes into cache memory of the node and/or prefetching data necessary to honor the request from stable storage of the node in to cache memory. Thus, when the Node receives back from the Client the Datallode request to retrieve the data, the data is already residing in cache memory of the Node, or in process of being loaded into cache memory, and likely increasing the responsiveness to HDFS read requests. It can be appreciated that in some examples, where a traditional HDFS client has to communicate with multiple different Datallodes to construct all the blocks necessary for the file/object the client is requesting, utilizing the methods disclosed herein, the HDFS client would only communicate with a single node, and could receive the data streamed from one client.

In another example, in a write, the node would be aware based on the NameNode request how much space needs to be allocated, whether a new object/file is being created, whether the write is associated with a new object/file or modifying an existing object/file, etc. In response to the receiving the NameNode request, the Node can begin tasks like allocating space in the cache and/or stable storage for the write data to be received, generating inodes for new files/objects, generating inodes for modified files/objects, etc. In one implementation, a Node can be determined based on the locking state of the inode associated with the HDFS request.

In another example, upon receiving a NameNode request associated with any operation by an HDFS client, the Node receiving the request could assess the performance of the non-native HDFS distributed file system and choose a node within the cluster with the most resources to honor the request. For example, at any point in time, a Node among the cluster of Nodes may be consuming resources honoring requests by other clients, performing system tasks, performing maintenance tasks, backing up data, etc. Because the node receiving the NameNode request has the discretion to select any node among the cluster of nodes to respond to the request, as any node has access to all data on the cluster, the node receiving the NameNode request can choose a node to honor the request based on the amount of resources available to honor the request. In contrast, in a typical HDFS installation, the NameNode would be limited to nodes which actually hosted the data to cite as Datallodes to the client. The non-native HDFS file system depicted in FIG. 2 utilizing the HDFS protocol component and OneFS operating system is not limited to selecting Datallodes that currently have the data in stable storage within the node and can select a node that maximizes performance to the HDFS client. In another non-limiting example, the node selected to be the Datallode and to honor the request by the HDFS client could be selected because it has the most amount of data blocks stored locally within the Node, thus minimizing communication and data exchange on the cluster communication backplane to honor the request.

Figure 3:
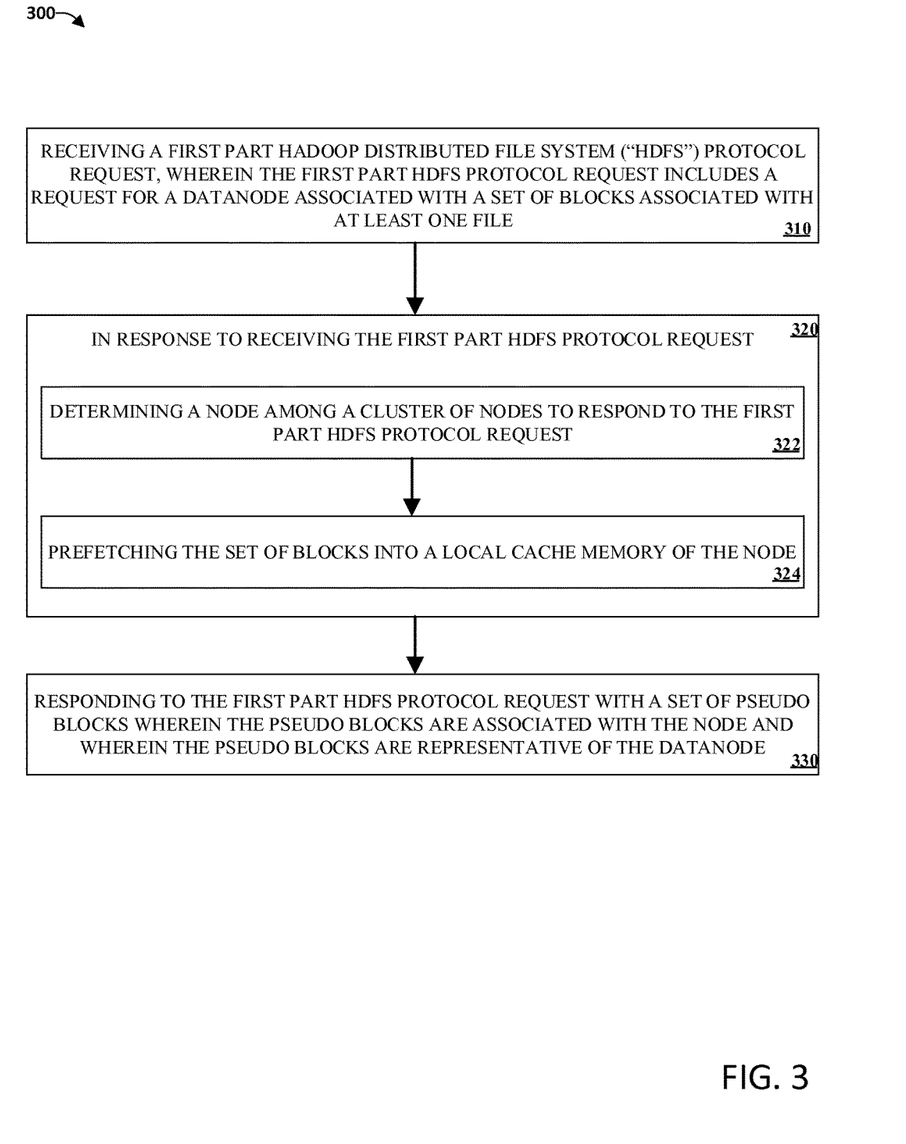
FIG. 3 illustrates an example method for using discriminative information learned from NameNode requests to improve HDFS client performance in a non-native HDFS environment in accordance with implementations of this disclosure.
Figure 4:
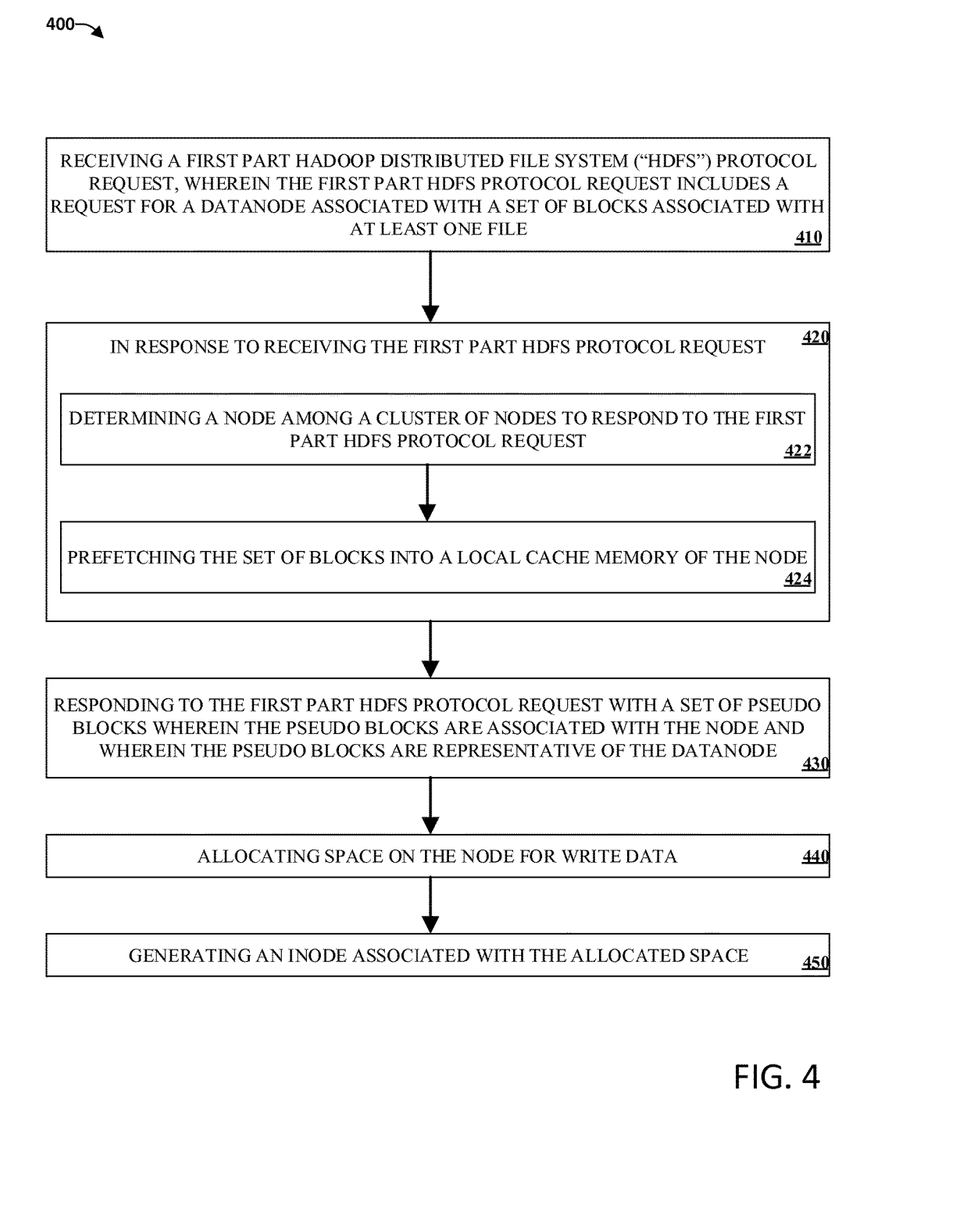
FIG. 4 illustrates an example method for using discriminative information learned from NameNode requests to improve HDFS client performance in a non-native HDFS environment including disk allocation and metadata structure creation in accordance with implementations of this disclosure.

FIGS. 3-4 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 3 illustrates an example method for using discriminative information learned from NameNode requests to improve HDFS client performance in a non-native HDFS environment in accordance with implementations of this disclosure. At 310, a first part HDFS protocol request can be received, wherein the first part HDFS protocol request includes a request for a Datallode associated with a set of block associated with at least one file. For example, the first part HDFS protocol request is a NameNode request that asks for a series of DataNodes to fulfill read/writes by a client.

At 320, in response to receiving the first part HDFS protocol request, the method can proceed with two actions. At 322 a node among the cluster of nodes can be determined to respond to the first part HDFS protocol request. In one implementation, determining the node among the cluster of nodes is based on a least activity node among the cluster of nodes.

For example, the cluster can be actively monitored for resources consumer and/or resources available for nodes among the cluster of nodes and a node can be selected based upon have the most or the most appropriate type of resources available to respond to the HDFS request. In another implementation, the node among the cluster of nodes is determined based on the set of blocks being available in a local stable storage of the node.

In one example, a file may be distributed, in blocks across an entire distributed file system; however, one node among the cluster of nodes may have more blocks available to it locally than other nodes in the cluster. It can be appreciated that by selecting a node with more blocks available locally, backplane communications amongst the nodes can be reduced, as the node processing the request won't have to retrieve as much data from other nodes in the cluster as other possible nodes that could respond to the HDFS client. In one implementation, determining the node among the cluster of nodes can be based on at least one block in the set of blocks being available in the local cache memory of the node.

In another example, the cache may already contain copies of the blocks associated with the first part HDFS protocol request due to the blocks being accessed by another process, or still remaining in cache from a previous transaction/process. Thus, if the node with data blocks relevant to the HDFS request already has the blocks stored within it's cache, less data will have to be preloaded into cache and/or transferred from other nodes among the cluster of nodes and stored within local cache memory.

At 324, the set of blocks referenced in the first part HDFS protocol request can be prefetched into a local cache memory of the node. In one implementation, the set of blocks can be prefetched into stable storage of the node. At 330, the first part HDFS protocol request can be responded to with a set of pseudo blocks wherein the pseudo blocks are associated with the node, and wherein the pseudo blocks are representative of the DataNode.

FIG. 4 illustrates an example method for using discriminative information learned from NameNode requests to improve HDFS client performance in a non-native HDFS environment including disk allocation and metadata structure creation in accordance with implementations of this disclosure. Steps 410-430 are the same as steps 310-330 as described above with respect to FIG. 3. At 440, space can be allocated on the node for write data. At 450, an inode associated with the allocated space can be generated.

Figure 5:
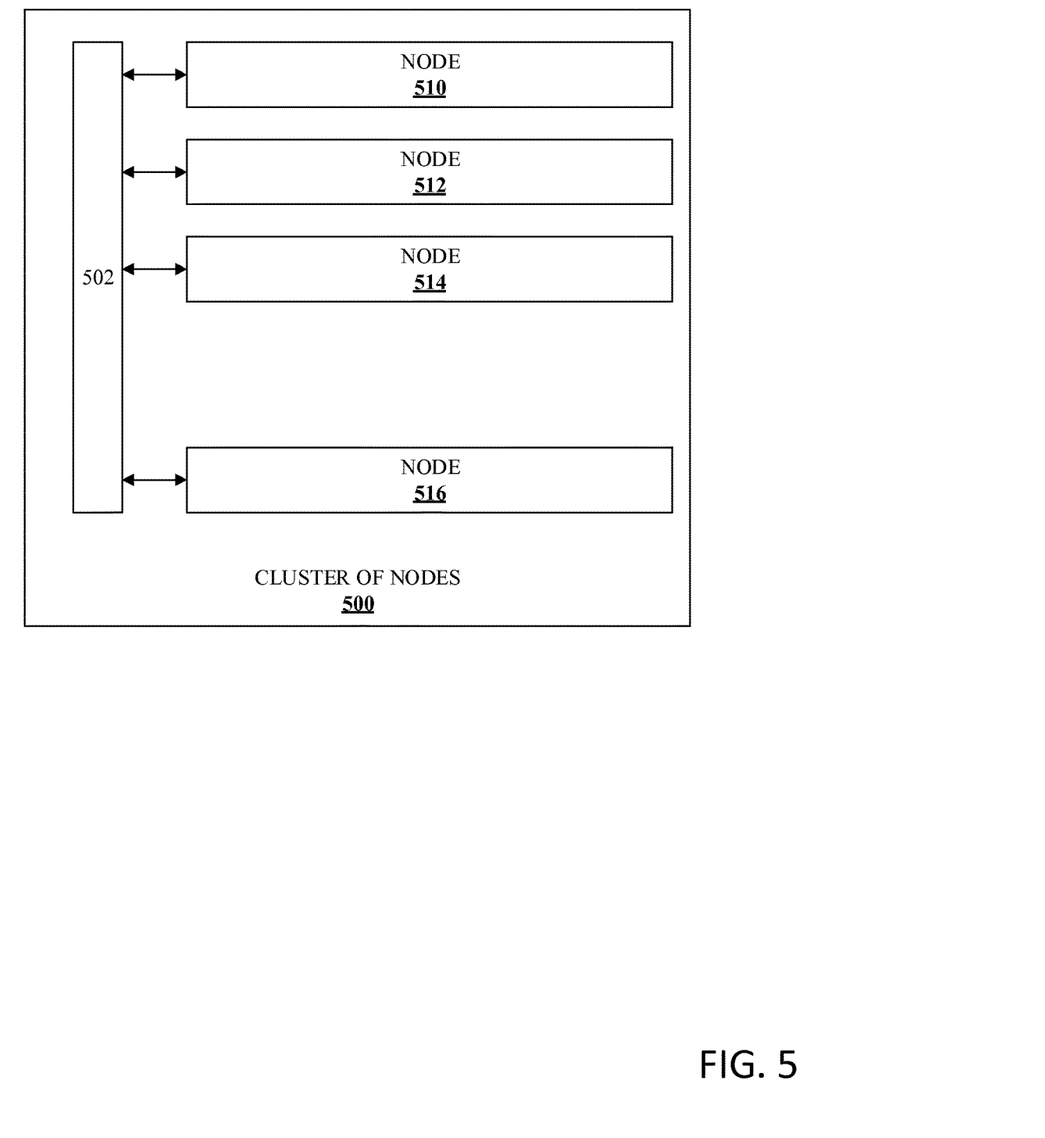
FIG. 5 illustrates an example block diagram of a cluster of nodes in accordance with implementations of this disclosure.

FIG. 5 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, a cluster of nodes typically includes several computers that merely require a network connection and a power cord connection to operate. Each node computer often includes redundant components for power and interfaces.

The cluster of nodes 500 as depicted shows Nodes 510, 512, 514 and 516 operating in a cluster; however, it can be appreciated that more or less nodes can make up a cluster. It can be further appreciated that nodes among the cluster of nodes do not have to be in a same enclosure as shown for ease of explanation in FIG. 5, and can be geographically disparate. Backplane 502 can be any type of commercially available networking infrastructure that allows nodes among the cluster of nodes to communicate amongst each other in as close to real time as the networking infrastructure allows. It can be appreciated that the backplane 502 can also have a separate power supply, logic, I/O, etc. as necessary to support communication amongst nodes of the cluster of nodes.

It can be appreciated that the Cluster of Nodes 500 can be in communication with a second Cluster of Nodes and work in conjunction to provide a distributed file system. Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

Figure 6:
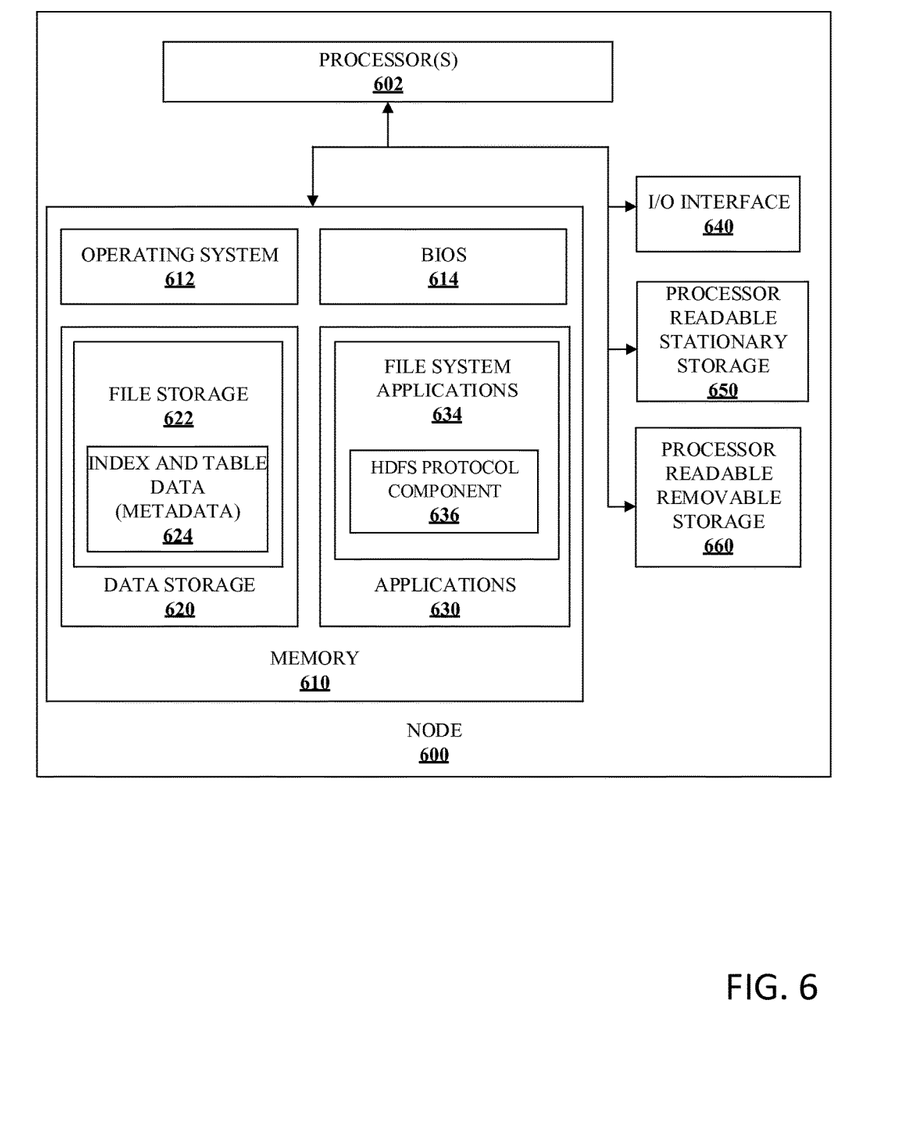
FIG. 6 illustrates an example block diagram of a node in accordance with implementations of this disclosure.

FIG. 6 illustrates an example block diagram of a node 600 in accordance with implementations of this disclosure.

Node 600 includes processor 602 which communicates with memory 610 via a bus. Node 600 also includes input/output interface 640, processor-readable stationary storage device(s) 650, and processor-readable removable storage device(s) 660. Input/output interface 640 can enable node 600 to communicate with other nodes, mobile devices, network devices, and the like. Processor-readable stationary storage device 650 may include one or more devices such as an electromagnetic storage device (hard disk), solid state hard disk (SSD), hybrid of both an SSD and a hard disk, and the like. In some configurations, a node may include many storage devices. Also, processor-readable removable storage device 660 enables processor 602 to read non-transitive storage media for storing and accessing processor-readable instructions, modules, data structures, and other forms of data. The non-transitive storage media may include Flash drives, tape media, floppy media, disc media, and the like.

Memory 610 may include Random Access Memory (RAM), Read-Only Memory (ROM), hybrid of RAM and ROM, and the like. As shown, memory 610 includes operating system 612 and basic input/output system (BIOS) 614 for enabling the operation of node 600. In various embodiments, a general-purpose operating system may be employed such as a version of UNIX, LINUX™, a specialized server operating system such as Microsoft's Windows Server™ and Apple Computer's IoS Server™, or the like.

Applications 630 may include processor executable instructions which, when executed by node 600, transmit, receive, and/or otherwise process messages, audio, video, and enable communication with other networked computing devices. Examples of application programs include database servers, file servers, calendars, transcoders, and so forth. Applications 630 may include, for example, file system applications 634, and an HDFS protocol component 636 according to implementations of this disclosure. It can be appreciated that HDFS protocol component 636 can store information in memory 610 such as in a cache or the like for use during prefetch operations as discussed supra.

Human interface components (not pictured), may be remotely associated with node 600, which can enable remote input to and/or output from node 600. For example, information to a display or from a keyboard can be routed through the input/output interface 640 to appropriate peripheral human interface components that are remotely located. Examples of peripheral human interface components include, but are not limited to, an audio interface, a display, keypad, pointing device, touch interface, and the like.

Data storage 620 may reside within memory 610 as well, storing file storage 622 data such as metadata or LIN data. It can be appreciated that LIN data and/or metadata can relate to rile storage within processor readable stationary storage 650 and/or processor readable removable storage 660. For example, LIN data may be cached in memory 610 for faster or more efficient frequent access versus being stored within processor readable stationary storage 650. In addition, Data storage 620 can also host index and table data 624 such as cursor data in accordance with implementations of this disclosure. Index and table data can be stored as files in file storage 622.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method for improving the performance of a Hadoop Distributed File System ("HDFS") in a non-native HDFS environment comprising:
   receiving from an HDFS client a first part HDFS Protocol NameNode request, wherein the first part HDFS protocol request includes a request for a Data Node associated with a set of blocks associated with at least one file;
   in response to receiving the first part HDFS protocol request:
      determining a node among a cluster of nodes to respond to the first part HDFS protocol request, wherein the node is representative of the Data Node responsive to the first part HDFS protocol request; and
      prefetching the set of blocks associated with the at least one file into a local cache memory of the node, wherein the set of blocks prefetched into the local cache memory are fully responsive to the first part HDFS Protocol request; and
   responding to the first part HDFS Protocol request with a set of pseudo blocks wherein the set of pseudo blocks are representative of the set of blocks prefetched into the local cache memory of the node.

2. The method of claim 1, wherein the determining the node among the cluster of nodes is based on a least activity node among the cluster of nodes.

3. The method of claim 1, wherein the determining the node among the cluster of nodes is based on the set of blocks being available in a local stable storage of the node.

4. The method of claim 1, wherein the determining the node among the cluster of nodes is based on at least one block in the set of blocks being available in the local cache memory of the node.

5. The method of claim 1, wherein in response to receiving the first part HDFS protocol request, further:
   allocating space on the node for write data; and
   generating an inode associated with the allocated space.

6. A system for improving the performance of a Hadoop Distributed File System ("HDFS") in a non-native HDFS environment comprising at least one node in a cluster of nodes, wherein the at least one node comprises at least one storage device and at least one hardware processor configured to:
   receive from an HDFS client a first part HDFS Protocol NameNode request, wherein the first part HDFS protocol request includes a request for a Data Node associated with a set of blocks associated with at least one file;
   in response to receiving the first part HDFS protocol request:
      determine a node among the cluster of nodes to respond to the first part HDFS protocol request, wherein the node is representative of the Data Node responsive to the first part HDFS protocol request; and
      prefetch the set of blocks associated with the at least one file into a local cache memory of the node, wherein the set of blocks prefetched into the local cache memory are fully responsive to the first part HDFS Protocol request; and
   respond to the first part HDFS Protocol request with a set of pseudo blocks wherein the set of pseudo blocks are representative of the set of blocks prefetched into the local cache memory of the node.

7. The system of claim 6, wherein the determining the node among the cluster of nodes is based on a least activity node among the cluster of nodes.

8. The system of claim 6, wherein the determining the node among the cluster of nodes is based on the set of blocks being available in a local stable storage of the node.

9. The system of claim 6, wherein the determining the node among the cluster of nodes is based on at least one block in the set of blocks being available in the local cache memory of the node.

10. The system of claim 6, wherein in response to receiving the first part HDFS protocol request, the system is further configured to:
   allocate space on the node for write data; and
   generate an inode associated with the allocated space.

11. A non-transitory computer readable medium with program instructions stored thereon for improving the performance of a Hadoop Distributed File System ("HDFS") in non-native HDFS environment by performing the following acts:
   receiving from an HDFS client a first part HDFS Protocol NameNode request, wherein the first part HDFS protocol request includes a request for a Data Node associated with a set of blocks associated with at least one file;
   in response to receiving the first part HDFS protocol request:
      determining a node among a cluster of nodes to respond to the first part HDFS protocol request, wherein the node is representative of the Data Node responsive to the first part HDFS protocol request; and
      prefetching the set of blocks associated with the at least one file into a local cache memory of the node, wherein the set of blocks prefetched into the local cache memory are fully responsive to the first part HDFS Protocol request; and
   responding to the first part HDFS Protocol request with a set of pseudo blocks wherein the set of pseudo blocks are representative of the set of blocks prefetched into the local cache memory of the node.

12. The non-transitory computer readable medium of claim 11, wherein the determining the node among the cluster of nodes is based on a least activity node among the cluster of nodes.

13. The non-transitory computer readable medium of claim 11, wherein the determining the node among the cluster of nodes is based on the set of blocks being available in a local stable storage of the node.

14. The non-transitory computer readable medium of claim 11, wherein the determining the node among the cluster of nodes is based on at least one block in the set of blocks being available in the local cache memory of the node.

15. The non-transitory computer readable medium of claim 11, wherein in response to receiving the first part HDFS protocol request, program instructions stored thereon to further perform the following acts:
   allocating space on the node for write data; and
   generating an inode associated with the allocated space.

* * * * *